March 10, 1942.   C. H. GAY   2,275,520
BRANCH FITTING
Filed Dec. 4, 1937   4 Sheets-Sheet 1

INVENTOR.
Cecil H. Gay
BY
ATTORNEY.

March 10, 1942.  C. H. GAY  2,275,520
BRANCH FITTING
Filed Dec. 4, 1937  4 Sheets-Sheet 2
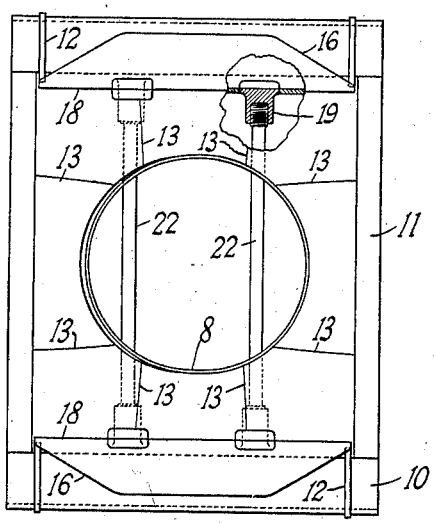
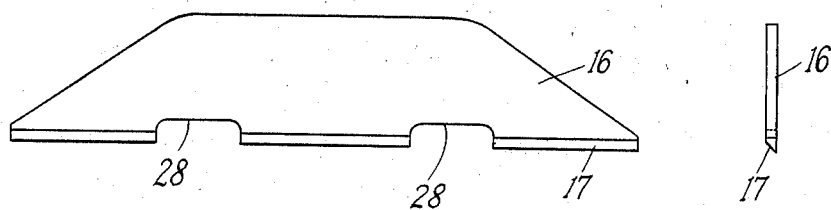
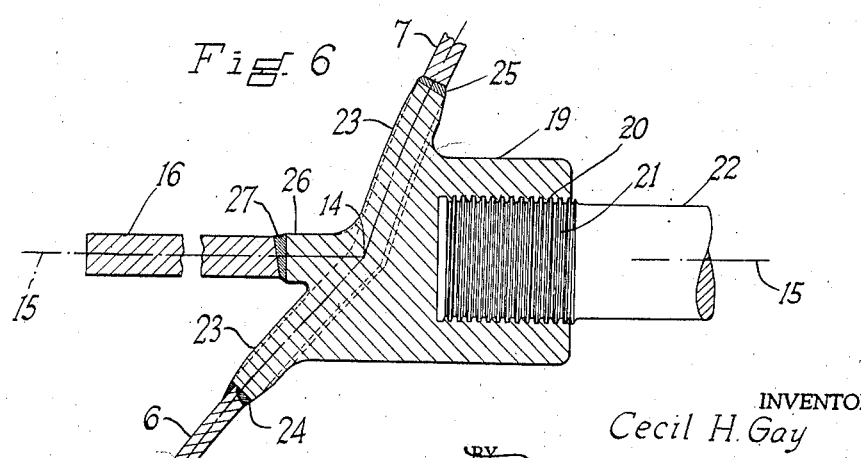
INVENTOR.
Cecil H. Gay
BY
ATTORNEY.

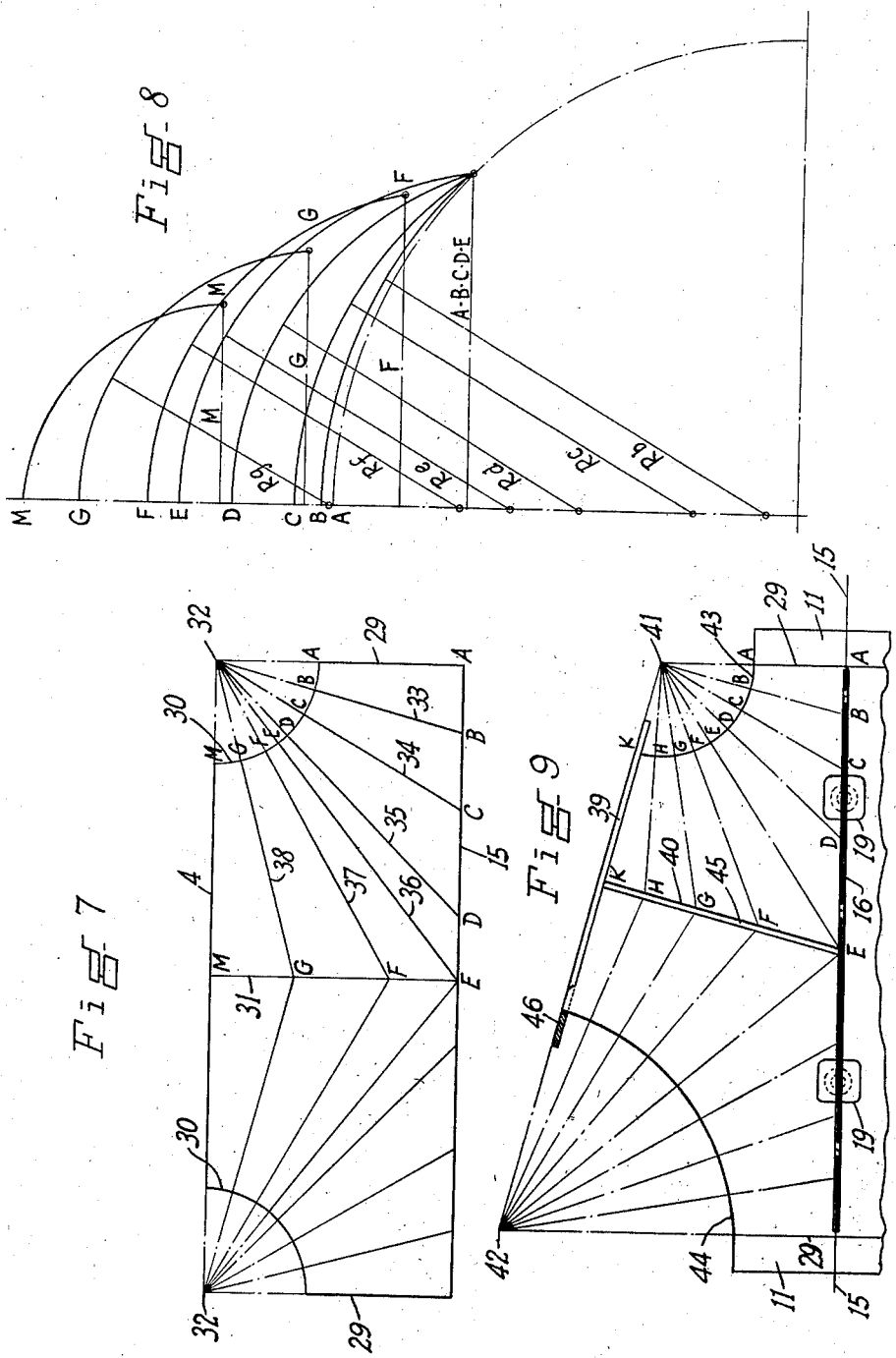

Patented Mar. 10, 1942

2,275,520

UNITED STATES PATENT OFFICE 2,275,520

BRANCH FITTING

Cecil H. Gay, Akron, Ohio, assignor to The Babcock & Wilcox Company, Newark, N. J., a corporation of New Jersey Application December 4, 1937, Serial No. 178,074

7 Claims. (Cl. 285—106)

In modern penstock systems or the like, where large quantities of liquid are transported, the conduit members are necessarily of large diameters and being subject to loads of great magnitude due to high internal fluid pressure and other forces, careful consideration is required in developing a suitable structure for the service intended. Such systems often include branch fittings whereby the liquid may be distributed through other connecting conduits, and it is with this phase of the construction that the present invention is particularly concerned.

The present invention is directed particularly to a type of fitting to be used, for example, as a transition member between conduits whose axes intersect or are otherwise disposed in transverse relation to each other, the completed structure including a plurality of plate members individually formed and welded together at their edges to provide a structure capable of withstanding the high stresses to which it is subjected in service, and one which can be economically built even in the larger sizes.

An object of the invention lies in the particular contour of the membrane surfaces whereby the transition from the diameter of the main conduit to the diameter of the branch conduit is made with precise determination of the stresses involved, and the unbalanced forces such as result from the interrupted circularity of the conduit wall, concentrated along predetermined lines to permit the advantageous application of means adequately resisting such forces; thus, in such a structure the stresses are properly distributed as well as maintained within allowable working limits, and with the accurate determination of stresses it is possible to intelligently select parts of proper dimensions for the required strength while avoiding the use of unnecessarily oversize parts with the attendant excessive weight and cost.

A further object of the invention deals with a branch fitting of such configuration that the internal fluid pressure is resisted throughout by a series of convergent arcuately formed pressure elements.

An additional object is in the concentration of unbalanced forces, other than those of direct tension due to internal pressure, along lines coextensive with the axis of the conduit, for example, at opposite sides of the main conduit, at the intersections of a chordal plane with the conduit wall.

The invention also includes the manner of resisting the unbalanced forces along lines paralleling the axis of the main conduit, and if required, providing supplemental reinforcement in the direction of the branch axis.

The objects and advantages of the invention are more fully apparent from the description which follows, particularly when read in connection with the accompanying drawings which illustrate certain practical embodiments, and in which:

Fig. 3 is a side view of the same fitting, partly broken away, taken at right angles to Fig. 2;

Fig. 4 and Fig. 5 are views detailing a reinforcing member;

Fig. 6 is an enlarged fragmentary view, in section, showing other reinforcing details;

Figs. 7 and 8 are diagrams indicating the relative locations and dimensions of the curved surface-determining elements;

Fig. 9 is illustrative of a modification, wherein the fitting is of unsymmetrical contour and reinforcement is provided along lines coextensive with the branch axis.

Figure 2:
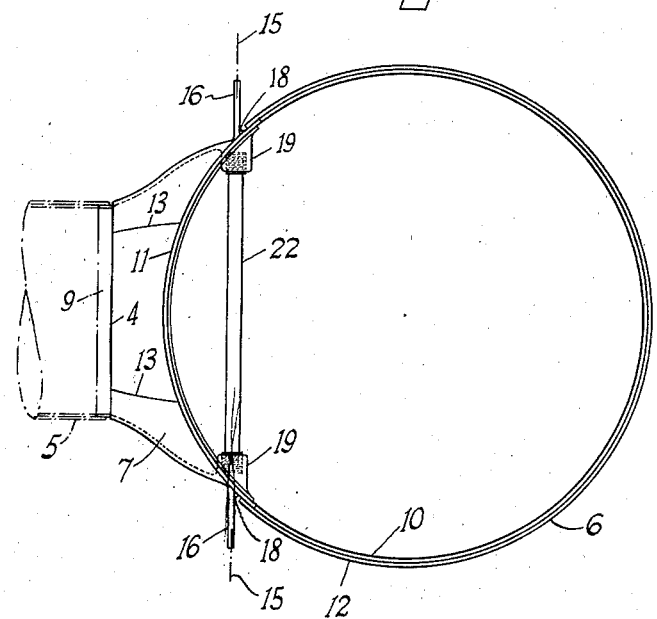
Fig. 2 is an end view of the fitting shown in Fig. 1.

The branch fitting 1 terminates in cylindrical ends 2 for connection to companionate ends of adjacent conduits 3, and is provided with a side outlet at 4 for connection to a branch conduit 5 of smaller diameter. The branch fitting has a body portion 6 of cylindrical contour, and a branch portion 7 of special configuration as described in detail hereinafter, the branch portion 7 terminating in an elliptically shaped outlet opening 8 in plane 4 which is parallel to the longitudinal axis of the fitting, the connection to the branch conduit 5 being made through an elliptical ring 9, welded to the wall surrounding the outlet opening 8. The connection between the cylindrical ends 2 and adjacent lengths of the main conduit may conveniently be made through a pinned-type of girth joint, the branch fitting having segmental cylindrical end portions 10 and 11 forming, respectively, extensions of the main body portion and of the transition section, to accommodate a butt strap overlapping the end of the branch fitting and the complementary cylindrical end of the adjacent conduit. A reinforcing strip 12 at each end is also preferably welded to the cylindrically formed body portion of the fitting.

The portion 7 whereby transition is made from the large diameter of the segmental body portion 6 to the dimensions at the outlet opening 8, is constructed of individually formed plates of predetermined area and surface contour and welded together preferably by fusion welding at their edges, the lines 13 indicating the location of such junctures. The cylindrically formed body portion 6 may also conveniently comprise a plurality of smaller plate units welded together to the required size of fitting.

The juncture between the body portion 6 and the transition section or outlet portion 7 is made along lines 14 at opposite sides of the outlet portion where the circularity of the body portion 6 is interrupted by the chordal plane 15—15 parallel to the longitudinal axis of the conduit. In accordance with the invention, the unbalanced forces, other than direct tension resulting from internal fluid pressure, are concentrated along the lines 14 and reinforcement is accordingly provided in that region to adequately resist such unbalanced forces.

Reinforcement along the juncture lines 14 is provided by header beams 16, such as detailed in Figs. 4 and 5, which are secured to the branch fitting at opposite sides of the outlet 8, each beam 16 being shaped along one edge 17, for example, to conform in contour to the surface to which it is joined, preferably by means of fillet welds along opposite sides as at 18; also, at spaced intervals along the lines 14, tie-rod sockets 19 are welded in place and being interiorly threaded as at 20, receive the threaded ends 21 of the tie rods 22.

The tie-rod sockets may be of flanged construction, and as shown in Fig. 6 form inserts in the wall of the fitting, the flange or skirt 23 having one portion fused welded at 24 to the cylindrical wall of the body portion 6, and another portion welded at 25 to the wall of the transition section 7, and outer rib 26 being provided for a welded connection 27 between the socket and a corresponding recessed portion 28 of header beam 16. With the parts so arranged, the tie rods 22 have their axes in the chordal plane 15—15 which contains the juncture lines 14, and the beams 16 are symmetrically positioned, as to their thickness, with respect to the same plane.

Figure 1:
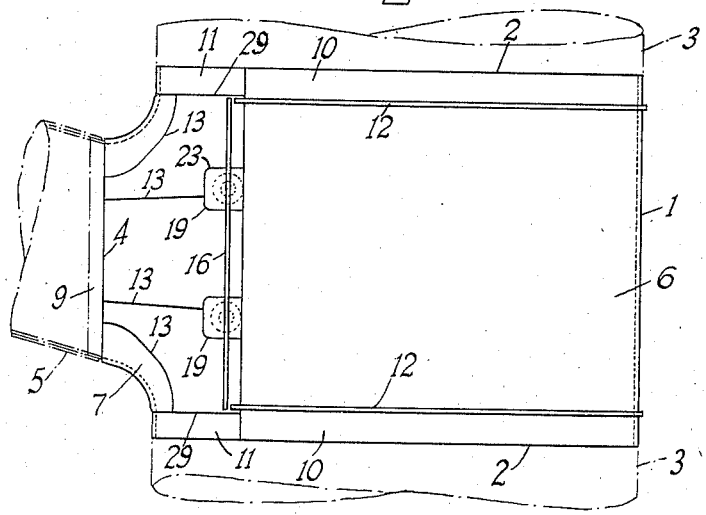
Fig. 1 is a plan view of a conduit fitting embodying features of the invention.

The particular contour of the transition section 7 will be evident from the diagrammatic Figs. 7 and 8. The membrane surface may be defined, in relation to the embodiment shown, as comprising a series of arcuate elements of progressively varying radii and lying in converging planes at each side of the branch axis. In Fig. 7 there is a representation in outline of the transition section 7 as seen in Fig. 1 and, for convenience and clarity, corresponding numerals indicate corresponding positions of the parts in both figures. Line 15 represents the plane of juncture between the transition section and the cylindrically formed body portion of the fitting; lines 29, the planes of juncture between the transition section 7 and the cylindrical extensions 11; line 4, the plane of the outlet opening 8; and lines 30, the curved outline of the transition section, in projection, as the contour changes from the cylindrical form at 29 about the axis of the main conduit to the elliptical form at 4 about the axis of the branch outlet. The line 31 represents a plane passing through the axis of the outlet opening 8 and, in the form shown, being perpendicular to the longitudinal axis of the main body portion, is the axis of symmetry for the right and left hand portions of the section.

The planes 4 and 29 which, as shown, are at right angles to each other, intersect along the lines 32 and about these lines as centers, circular arcs 30 of suitable radii determine the curved outline of the transition section at this location. At convenient angles about each line 32 a series of converging planes are indicated, such planes all intersecting at the line 32 and each containing an arcuate element of the surface of the transition section. As many such planes are selected as may be deemed necessary for an accurate development of the surface contour. For convenience, the detailed description which follows will be directed particularly to the development of one half of the section as the construction on the opposite side of plane 31 is a duplication.

In the end plane 29 the arcuate element AA has a radius equal to the radius of the cylindrical body portion of the fitting and a chordal dimension equal to the distance between lines 14 at opposite sides of the central axis. In an intermediate plane 33 the arcuate element BB has the same chordal dimension as the element AA but is of smaller radius, and similarly for arcuate elements CC, DD, and EE in planes 34, 35 and 36, thus providing a membrane surface whose elements are a series of circular arcs of progressively varying radii and lying in converging planes having a common line of intersection exteriorly of the conduit. It is to be understood, however, that certain features of the invention may be applied where the planes which contain the curved surface elements, while converging, may, if desired, have their intersections in a plurality of lines.

Figure 10:
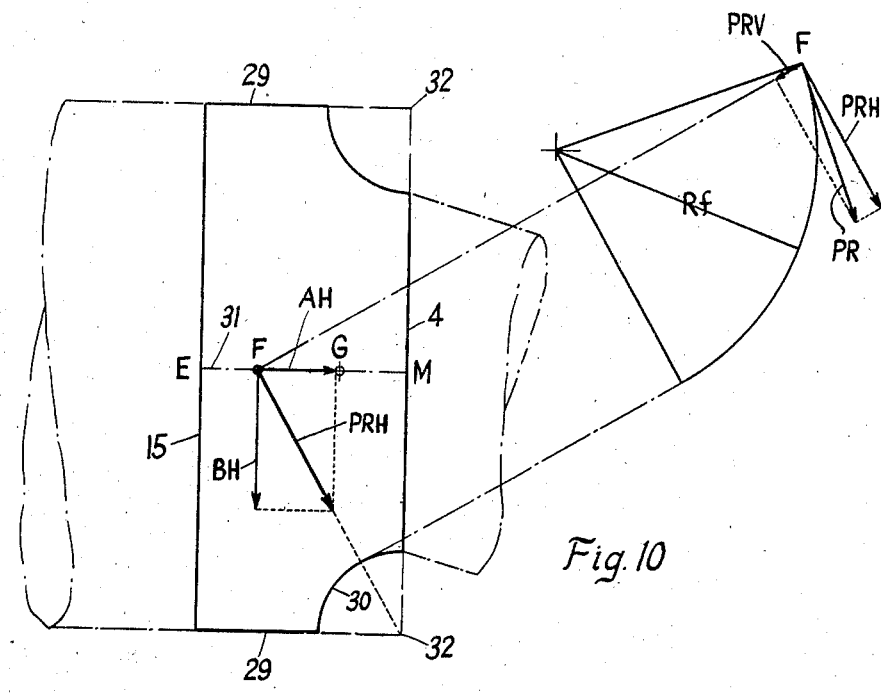
Figs. 10 and 11 are diagrams indicating forces resulting from internal fluid pressure.
Figure 11:
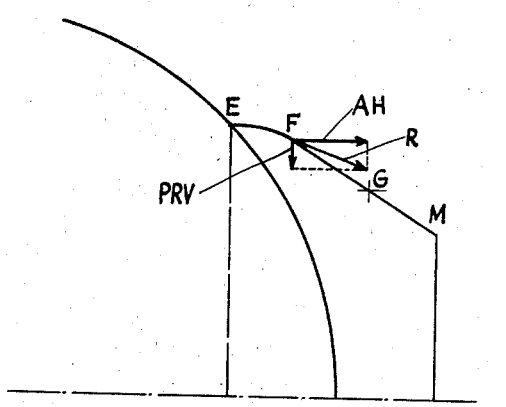

For succeeding planes such as 37 and 38, the arcuate elements FF and GG, for one side of the section are in opposing relation at the plane 31 with corresponding arcuate elements for the opposite side. In order that such elements will be subjected substantially to only direct tensile stresses with no bending, the membrane elements are made circular, or parts of circles, and of such radii and chordal dimensions as to cause all opposing elements which do not form complete circles to terminate in common tangential planes which are tangent to the contour of the fitting at the intersections of those elements with the plane 31; thus, there are no unbalanced forces at the juncture plane 31 and consequently no supplementary reinforcement, such as a beam or other supporting member, is needed at this location. Between plane 36 and the end plane 4 the successive intermediate elements, such as FF and GG, do not have a constant chordal dimension but rather chords of graduated lengths, as determined by the condition that opposing interrupted circular elements at each location must terminate in a common tangential plane. Figs. 10 and 11 indicate a method by which the radii and chordal dimensions of such opposing branch elements may be determined to provide the desired equilibrium of forces at the plane 31. Referring to Fig. 10, and selecting the element through point F as an example, the line PR represents the force acting tangentially of the arcuate element FF due to pressure. The components of PR are PRH in a horizontal plane and PRV in a vertical plane, as shown in the projected diagram at the right, assuming the chord through F to extend in a vertical direction. The horizontal component PRH is broken up into horizontal components AH in the juncture plane 31 and BH at right angles to that plane. In Fig. 11, the forces AH and PRV in the juncture plane are combined to provide the resultant force R which is tangent to the line of contour. The chordal dimensions of similar arcuate elements terminating at successive points are adjusted so that the resultant force at each position is tangent to the surface of the plate. The forces are thus in equilibrium and the plate is required to resist only direct tensile stresses.

The various arcuate elements and their respective radii are indicated in Fig. 8 and their relative chordal lengths indicated along lines projected over from Fig. 7, each half-chord being identified by letters A, B, C, etc., and each radius by R$a$, R$b$, R$c$, etc., in relation to letters AA, BB, CC, etc., which are used to identify the corresponding arcuate elements. Line M represents one-half of the minor axis of the ellipse formed by the opposing elements MM in plane 4.

The contour of the transition section in the median plane 31, between the plane 4 and the chordal plane 15—15, is therefore the locus of the extremities of chords E, F, G, etc., and finally the extremities of an axis of the elliptical element MM.

In Fig. 9, the line of juncture between arcuate elements of the transition section and the arcuate elements of the main body, is designated by 15, as in Fig. 7, along which line one of the longitudinal reinforcing beams 16 is located. The end face 39 is inclined to the axis of the main conduit and provides an opening, preferably circular, in a plane normal to the axis of the branch conduit, thus improving flow characteristics of the fitting by permitting connection to the branch conduit in direct alignment with its axis. The line 40 indicates the plane of the branch axis, and lines 29 as in Fig. 7, the planes at which the transition section joins the cylindrical extensions 11.

The planes 29 and 39 intersect at lines 41 and 42, and arcs 43 and 44 about such lines as centers, determine the contour of the fitting in its transition from the circular ends at 29 to the circular outlet opening in plane 39. The elements AA through EE all have a common chordal dimension, whereas elements such as FF, GG, HH and KK have chordal dimensions of varying lengths, for example, the dimensions of the elements terminating in plane 40 may, as an alternative to the form already described, change uniformly from the chordal length at plane 15 to the diameter of the outlet opening in end plane 39. With the contour thus determined, unbalanced forces exist along the juncture plane 40 due to the opposing elements not terminating in common tangential planes, and supplemental reinforcement is therefore supplied, here indicated as a beam 45, one at each side of the outlet, which is welded at one end to the beam 16. The diametrically opposed beams 45 are supported at their outer ends by a ring 46 which circumscribes the outlet opening, but is free from the wall of the section. Tie rod sockets 19, as before, are located in the plane 15—15, on opposite sides of the conduit, to receive tie rods 22 extending across its interior. This form of construction provides a means for resisting unbalanced forces within the transition section which arise through the interrupted continuity of the arcuate elements in a plane 40, for example, and to some extent is similar to the procedure followed in resisting unbalanced forces at the chordal plane 15.

It is to be noted that the structures herein disclosed embody certain features which are included in the subject matter of my copending application, Serial No. 732,021, filed June 23, 1934, now Patent No. 2,220,899 granted November 12, 1940. Such embodiments as are illustrated and described are to be regarded only as disclosures of the invention in one or more specific forms, and in no sense are the disclosures to be interpreted as limiting the invention to those particular embodiments. It is to be understood that the invention may be applied in variety to other tubular structures including, for example, pressure vessels and their connections wherein stresses due to fluid pressure may be of similar character and distribution, and accordingly it is intended that the appended claims be interpreted to embrace such structures, with restrictions in scope only as dictated by the prior art.

I claim:

1. A conduit fitting having main and branch portions whose membrane surfaces are joined along lines at opposite sides of the branch portion, said surfaces including arcuate elements of the branch surface in opposed relation to arcuate elements of the main surface at said lines, said branch surface including arcuate elements in opposed relation at lines determining the contour of the fitting in the direction of the branch axis, said opposing branch elements being disposed in planes converging toward the exterior of the fitting at opposite sides of the branch axis and terminating at successive positions along said lines of contour, said opposing elements and said lines of contour being substantially tangent to common planes at said successive positions.

2. A conduit fitting having body and branch conduit portions in intersecting relation, each portion being formed of substantially arcuate membrane surface elements in successive planes and each having elements connected to elements of the other along lines at opposite sides of the branch portion in a common plane, said branch portion including groups of arcuate elements lying in planes converging toward the exterior of said fitting at opposite sides of the branch axis, each group having elements connected to opposing elements of the other group in a succession of intersections determining contour lines of said fitting longitudinally of the branch axis, said elements having a common chordal dimension at each of said intersections and having varying radii and chordal dimensions at successive positions along said lines of contour, said elements and said lines of contour being substantially tangent to a common plane at each successive position.

3. A conduit fitting having intersecting body and branch portions joined along lines at opposite sides of the branch portion in a common plane, said body portion being formed throughout of arcuate elements in parallel planes, said branch portion being formed in part of arcuate elements connected to said arcuate elements of said body portion and in part of opposing arcuate elements arranged in groups at opposite sides of the branch axis and disposed in planes radiating from parallel lines positioned exteriorly of said fitting, said opposing branch elements being connected at the extremities of common chords whose said extremities determine contour lines of said fitting longitudinally of said branch portion said branch portion terminating in an elliptical opening having a principal axis in a line intersecting said parallel lines, said opposing branch elements having radii and chordal dimensions progressively increasing from the plane of said elliptical opening toward said juncture plane, said connected opposing elements and said contour lines being tangent to common planes at the extremities of said common chords.

4. A hollow structure for fluid under pressure comprising a tubular component having means for connecting said component to an angularly related tubular component, said means comprising a transition section, said transition section being composed of oppositely disposed groups of connected curvilinear surface-forming elements lying in intersecting planes and terminating in points determining contour lines of said transition section at the locus of intersection of said planes, said elements and said contour lines being substantially tangent to a common plane at each of said points.

5. A hollow structure for fluid under pressure comprising a tubular component having means for connecting said component to an angularly related tubular component, said means comprising a transition section, said transition section being composed of oppositely disposed groups of connected substantially arcuate surface-forming elements of varying radii lying in intersecting planes and terminating in points determining contour lines of said transition section at the locus of intersection of said planes, said planes converging toward the exterior of said structure at opposite sides of said transition section, said elements and said contour lines being substantially tangent to a common plane at each of said points.

6. A tubular structure comprising intersecting main and branch portions adapted to contain and conduct fluid under pressure, each being formed of substantially arcuate membrane surface elements in successive planes, the elements of said branch portion including groups of elements disposed in planes converging toward the exterior of the structure at opposite sides of the branch axis, each group having successive elements connected to opposing elements of the other group at the extremities of common chords, the extremities of said chords determining contour lines of said structure longitudinally of said branch portion, said connected elements having radii and chords of progressively varying dimensions at successive positions along said contour lines, said connected elements and said contour lines being tangent to common planes at the extremities of said chords whereby forces acting tangentially of successive opposing elements are resolved tangentially of the membrane surface upon a differential of pressure interiorly and exteriorly of the fitting.

7. A fluid-containing structure comprising tubular body and branch portions, each portion being formed of substantially arcuate membrane surface elements in successive planes and each having elements connected to elements of the other along lines symmetrically disposed at opposite sides of the branch portion, said branch portion including groups of arcuate elements lying in planes converging toward the exterior of said structure at opposite sides of the branch axis, each group having elements connected to opposing elements of the other group in a succession of intersections determining contour lines of said structure longitudinally of the branch axis, said interconnected branch elements having radii and common chordal dimensions progressively decreasing at successively greater distances from said body portion, said interconnected branch elements and said contour lines being tangent to common planes at said successive intersections whereby stresses in said branch portion are substantially restricted to tensile stresses upon a differential of fluid pressure interiorly and exteriorly of said structure.

CECIL H. GAY.